June 30, 1936. W. D. ARCHEA 2,045,685
TRANSMISSION AND CONTROL MECHANISM FOR MILLING MACHINES
Filed May 6, 1935 4 Sheets-Sheet 1
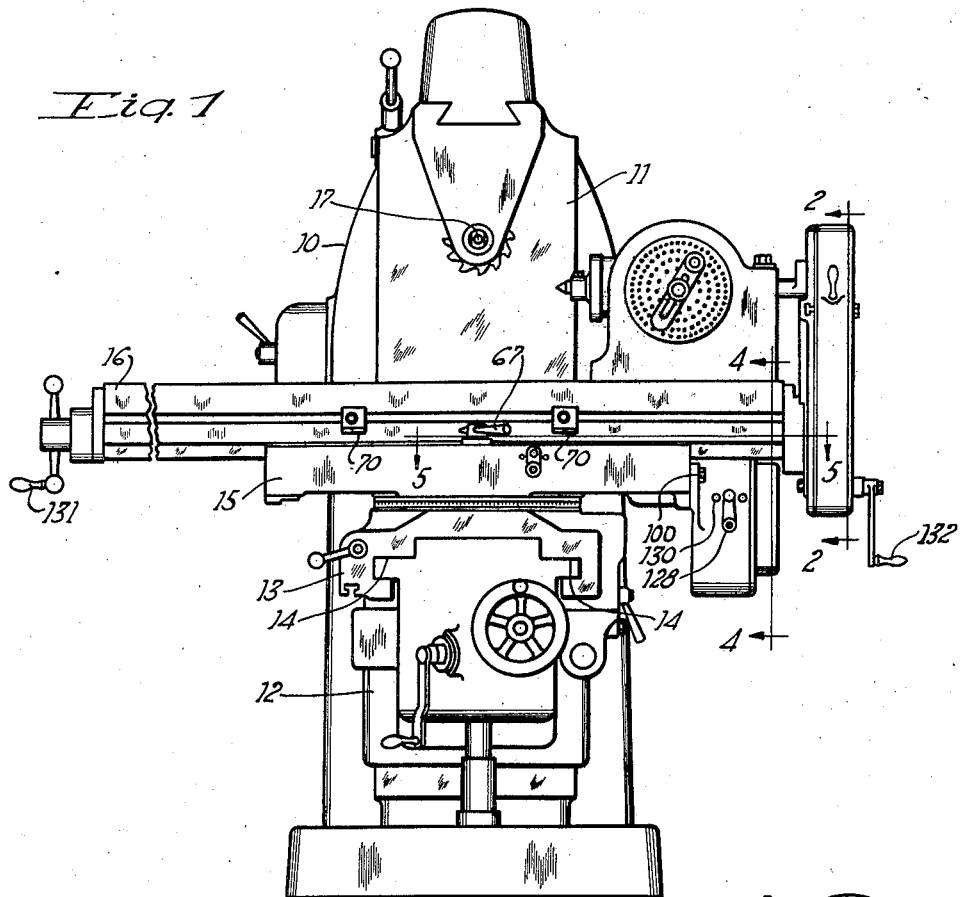
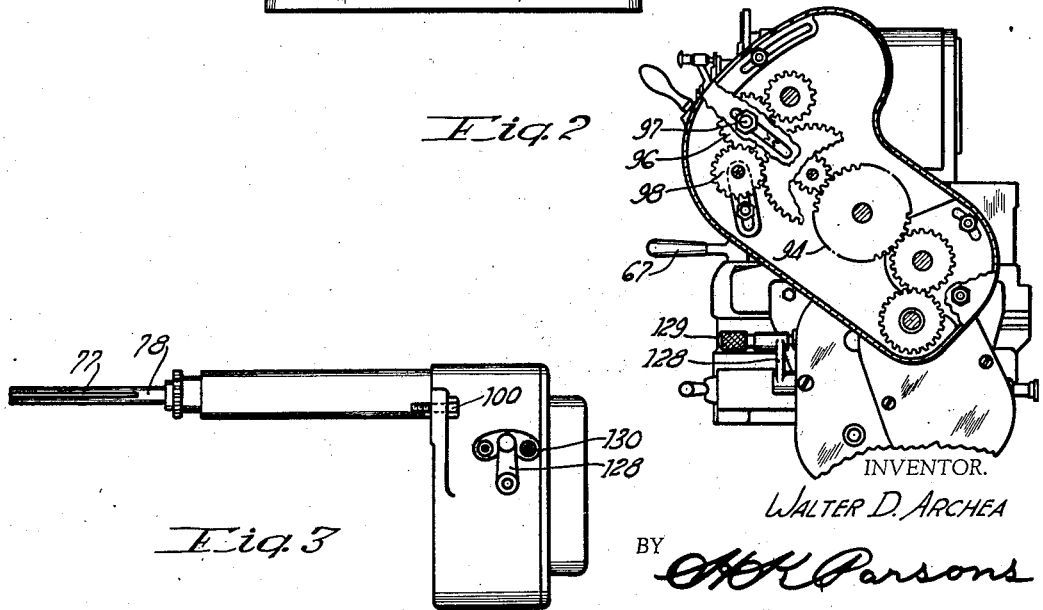
INVENTOR.
WALTER D. ARCHEA
BY
ATTORNEY.

June 30, 1936.  W. D. ARCHEA  2,045,685
TRANSMISSION AND CONTROL MECHANISM FOR MILLING MACHINES
Filed May 6, 1935  4 Sheets-Sheet 2

INVENTOR.
WALTER D. ARCHEA
BY
A. H. Parsons
ATTORNEY.

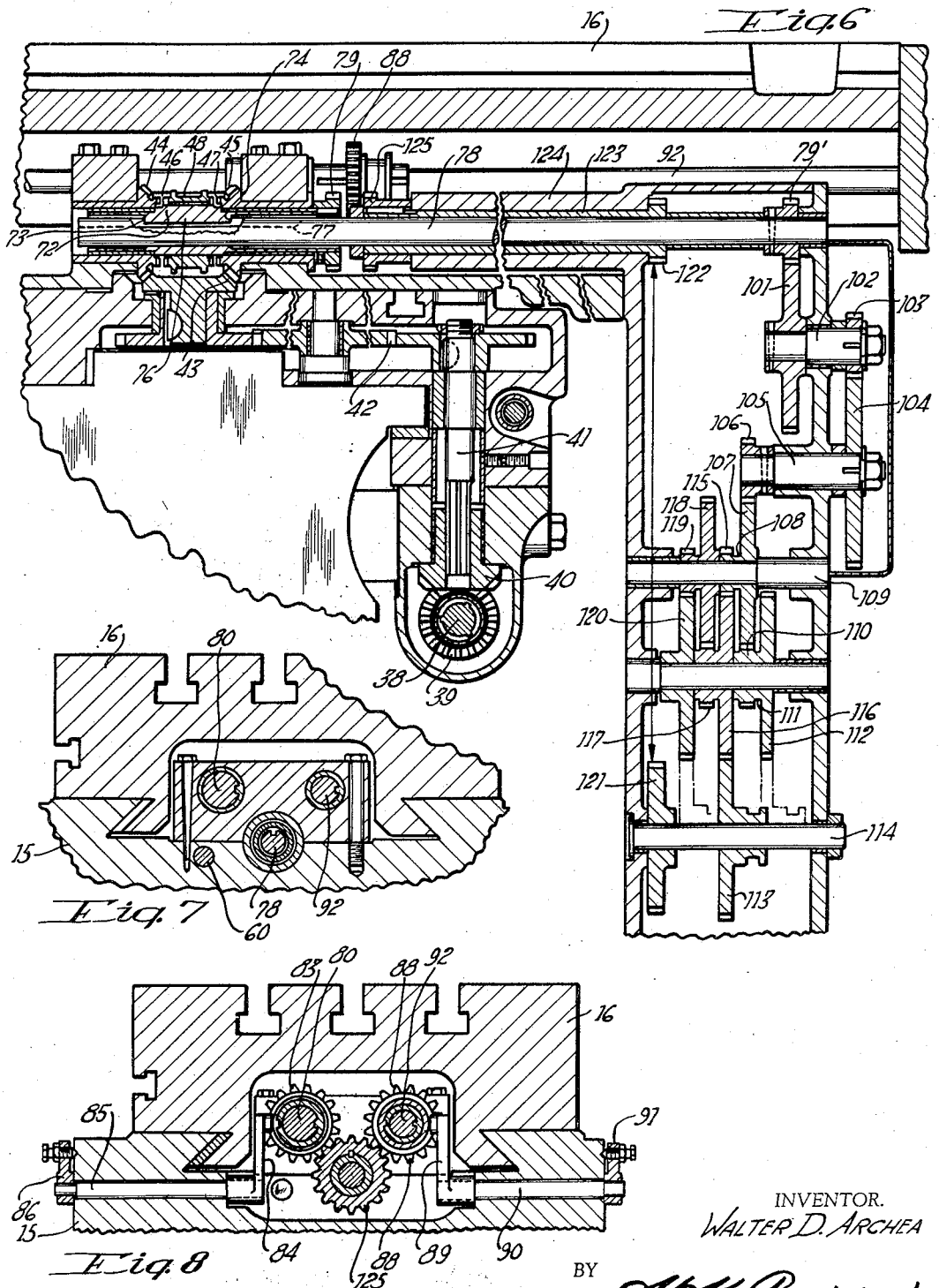

June 30, 1936.   W. D. ARCHEA   2,045,685
TRANSMISSION AND CONTROL MECHANISM FOR MILLING MACHINES
Filed May 6, 1935   4 Sheets-Sheet 4
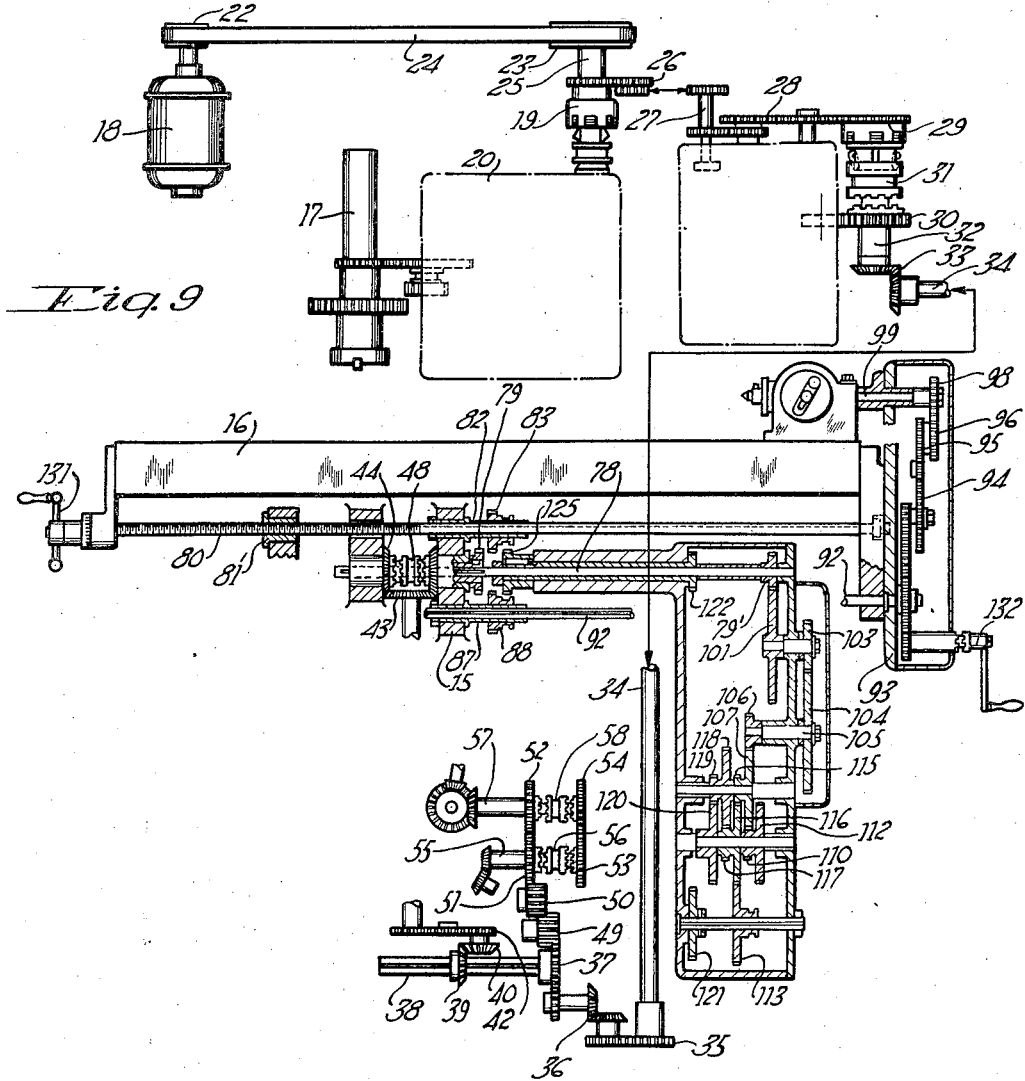
INVENTOR.
WALTER D. ARCHEA
BY
A. H. K. Parsons
ATTORNEY.

Patented June 30, 1936

2,045,685

UNITED STATES PATENT OFFICE 2,045,685

TRANSMISSION AND CONTROL MECHANISM FOR MILLING MACHINES

Walter D. Archea, Cincinnati, Ohio, assignor to The Cincinnati Milling Machine Co., Cincinnati, Ohio, a corporation of Ohio Application May 6, 1935, Serial No. 19,926

22 Claims. (Cl. 90—20)

This invention relates to milling machines and more particularly to improvements in transmission and control mechanism therefor.

One of the objects of this invention is to simplify the transmission, and thereby the adjustment controls of a milling machine, whereby it may be quickly set up for plain milling operations or for spiral milling operations.

Another object of this invention is to provide in milling machines a simple and efficient transmission mechanism for actuating various types of attachments that may be applied to the table of the machine so that from an operator's standpoint these attachments may be readily connected or disconnected for actuation from the main transmission of the machine.

A further object of this invention is to provide a variable rate change mechanism which may be applied to a milling machine having a table and attachment and quickly interposed between a common drive therefor, and either the table or attachment to reduce the rate of operation of either relative to the other.

An additional object of this invention is to simplify the setting up of a milling machine for obtaining long or short leads with a spiral milling attachment.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying the principles of this invention.

Figure 2 is a sectional view on the line 2—2 of Figure 1.

Figure 3 is of the rate change unit and shown detached from the machine.

Figure 6 is a sectional view through the reversing mechanism showing part of the power drive thereto and an expanded view of the rate change mechanism actuable through the reverser.

Figure 7 is a sectional view on the line 7—7 of Figure 5.

Figure 8 is another sectional view on the line 8—8 of Figure 5.

Figure 9 is a partially schematic diagram of the entire transmission mechanism for the machine.

Figure 4:
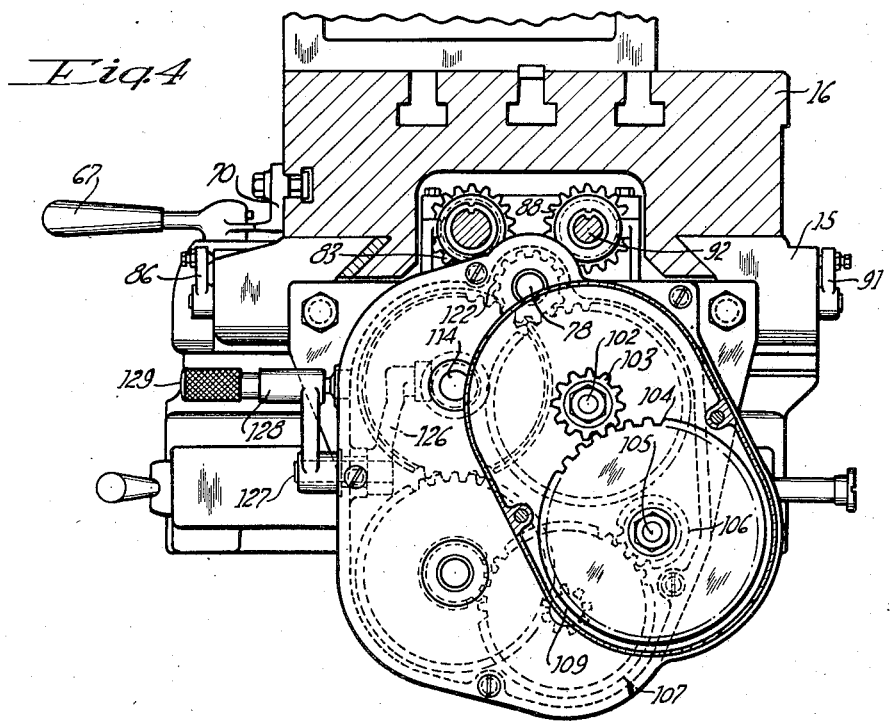
Figure 4 is a section on the line 4—4 of Figure 1, showing the relationship of the gearing in the rate change unit.
Figure 5:
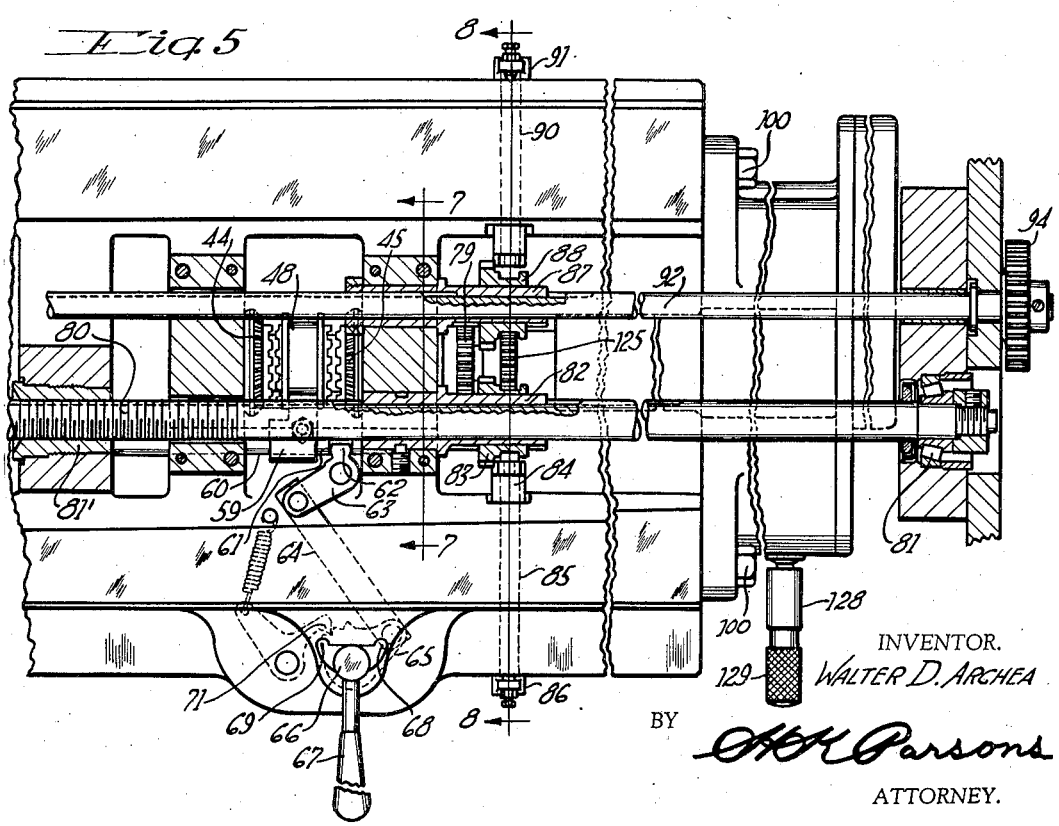
Figure 5 is a sectional view on the line 5—5 of Figure 1.

The machine shown in Figure 1 of the drawings is structurally a conventional knee and column type universal milling machine, comprising a column 10 having vertical guide ways 11 on the front face thereof upon which is mounted a knee 12 for vertical movement or adjustment, the knee in turn supporting a saddle 13 on guide ways 14 for movement toward and from the face of the column.

The saddle has a housing 15 pivotally mounted thereon for adjustment about a vertical axis for varying the angularity of the table 16 carried thereby with respect to the face of the column, and more particularly with respect to the axis of the cutter spindle 17.

For plain milling machine operations the table is moved in a path which lies in a plane perpendicular to the axis of the cutter spindle. For spiral milling operations the housing 15 is adjusted so that the path of movement of the table is at an angle to the axis of the cutter spindle, which angle corresponds to the angle of the spiral being cut. It is also conventional practice to utilize a universally adjustable milling head for this purpose, but such use will not vary the principles of this invention. The table is also adapted for receiving other forms of work receiving attachments and these may be actuated through the same mechanism disclosed herein.

The mechanism disclosed herein is particularly adaptable for effecting simultaneous actuation of a spiral milling attachment and the table which supports it, and it is with this problem that so much difficulty has been experienced in the past on account of the wide range of leads which exist between the short lead which approaches a line perpendicular to the axis of rotation of the work and a long lead which approaches a straight line parallel to the axis of the work. At one of these extremes the table must move very slowly and at the other extreme the work must be rotated very slowly, and one of the features of this invention is to arrange the transmission mechanism in such a way that a rate reduction unit may be very easily and quickly interposed in the branch train to the element which must run the slower. This interposition is effected by a pair of shift levers and eliminates major set-up changes which have been necessary in the past.

The entire transmission of the machine has been illustrated diagrammatically in Figure 9 and comprises in general a prime mover 18 which actuates, through a start and stop clutch 19 and a variable speed transmission 20, the cutter spindle 17. The motor may be connected to one-half of the clutch 19 through pulleys 22 and 23, and a belt or other motion transmitting band 24. The pulley 23 may be secured to shaft 25 which carries one-half of the clutch 19. The shaft 25 is continuously running and is operatively connected to a second branch transmission, herein termed the variable feed transmission, through gearing indicated generally by the reference numeral 26 and shaft 27.

This shaft also drives the quick traverse transmission comprising the gearing 28 which terminates in the rapid traverse driver 29.

The variable feed transmission terminates in the gear 30 mounted co-axially with the rapid traverse driver 29, and a clutch 31 is shiftably interposed between these motors for selectively connecting them to the final output shaft 32.

The shaft 32 is connected by bevel gearing 33 to a vertical spline shaft 34, which has a sliding connection with a spur gear 35 carried in the knee of the machine whereby the knee may be vertically adjusted without breaking the driving connection. The gear 35 is connected through a gear train indicated generally by the reference numeral 36 to spur gear 37 fixed to the end of the spline shaft 38. This spline shaft extends parallel to the direction of movement of the saddle, and, as shown in Figure 6, the saddle has a bevel gear 39 movable therewith along the shaft 38 and intermeshing with a bevel gear 40 operatively connected to the end of shaft 41. This shaft drives through a train of spur gears indicated generally by the reference numeral 42, and bevel gear 43, a common reversing mechanism for the machine.

This bevel gear intermeshes with bevel gears 44 and 45 for oppositely rotating them and they have clutch teeth 46 and 47 formed on opposite faces thereof for interengagement with similar clutch teeth formed on opposite ends of a shiftable clutch member 48.

The gear 37 also serves to actuate the saddle and knee and is connected through the gear 49 and the idler 50 for rotation of gears 51 and 52 in one direction and the gear 49 is directly connected for rotation of gears 53 and 54 in an opposite direction. The oppositely rotating gears 51 and 53 are co-axial of shaft 55 which drives the saddle, and are connected to the shaft by means of the shiftable clutch 56.

The gears 52 and 54 are co-axially mounted on shaft 57 and selectively connected thereto by the shiftable clutch 58, which thereby determines the direction of movement of the knee. Thus the saddle and knee may be power operated from the prime mover 18 through either the variable feed transmission or the rapid traverse transmission. The clutch member 48 is moved by a shifter 59 fixed to a shifter rod 60 which has a notch 61 formed therein for receiving the ball-shaped end 62 of a bell crank 63. The other end of this bell crank is connected by a link 64 to a crank arm 65 fixed to the end of a vertical trip plunger 66, having a manually operable handle 67 and trip operable portions 68 and 69 which may be alternately engaged by suitably positioned dogs 70 carried by the table 16. A suitable spring operated detent mechanism 71 may also be provided for holding the trip plunger, and thereby the clutch, in three different operating positions.

The clutch member 48 is splined on the periphery of a sleeve 72 for axial movement relative thereto and the sleeve has shoulders 73 and 74 which abut the ends of gears 44 and 45, and thus hold the sleeve 72 against axial movement. The sleeve has a depending key 76 which is adapted to interengage a spline 77 formed in the drive shaft 78 of the variable rate unit shown in Figure 3.

The sleeve extends through and beyond the end of bevel gear 45 and has keyed thereto a spur gear 79. The reverser mechanism may thus be said to have two outputs comprising the gear 79 and the key portion 76.

Separate trains are provided for actuating the table and for actuating the attachment mounted on the table, and these trains are adapted to be selectively connected to these two outputs in various manners depending upon the relative rates of actuation thereof.

The table transmission train comprises a lead screw 80 which is supported in antifriction bearings 81 carried at opposite ends of the table for rotation therein and the lead screw passes through a nut 81' which is fixed with the saddle, whereby upon rotation of the screw through the nut the table 16 will be moved relative to the saddle. The lead screw also has a splined connection with a sleeve 82 which is rotatably journaled in the saddle but fixed against axial movement. Splined on this sleeve is a spur gear 83 which is adapted to be shifted along the sleeve by a shifter fork 84, Figure 8, supported by rotatable shaft 85 in the housing 15, the shaft having an operating handle 86 secured to the end thereof.

The train for operating the attachment also consists of a sleeve 87 which is rotatably journaled in the housing 15, but fixed against axial movement relative thereto. This sleeve has a shiftable gear 88 splined thereon which is shifted by a shifter fork 89 fixed to rotatable shaft 90, the shaft having an operating handle 91 fixed to the end thereof.

A shaft 92 is splined in the sleeve 87 for rotation thereby but the shaft is fixed with a quadrant plate 93 for removal therewith. This quadrant plate comprises a train of gearing 94 including the change gears 95 and 96 which are mounted co-axially on a laterally shiftable shaft 97, Figure 2, for varying the rate of rotation, and a reverser gear 98 which may be selectively interposed for changing the direction of rotation of the final output shaft 99. This quadrant plate is the same as that shown in U. S. Patent 1,961,524, issued to Lester F. Nenninger for a Milling machine, a further description of which is therefore not believed to be necessary.

It will now be seen that there are two independent trains, one for actuating the table and the other for actuating an attachment carried by the table, and each of these trains begins with an actuating gear such as the gear 83 for the table and the gear 88 for the attachment, and means are provided for selectively shifting these gears into engagement with the gear 79 which constitutes one of the outputs of the reverser mechanism. In other words, if both of the gears 79 83 and 88 are intermeshed with the gear 79 the drive shaft 92 and the lead screw 80 will be rotated at the same rate of speed and the change gears 95 and 96 on the quadrant plate may be so selected as to produce an intermediate range of spiral leads. As previously mentioned, however, it is necessary when cutting short leads to move the table at a very slow rate and when cutting long leads to move the attachment at a very slow rate. For this purpose, a rate reduction unit, previously referred to and shown separately in Figure 3, is detachably mounted on the housing by clamping bolts 100. When this unit is applied to the housing 15 the shaft 77 is inserted in driving engagement with the key portion 76.

As shown in Figure 6, the shaft 78 has a spur gear 79' fixed for rotation therewith and this gear rotates a gear 101 keyed on shaft 102 which carries a change gear 103 removably attached to the end thereof. This change gear is adapted to intermesh with a second change gear 104 removably attached to shaft 105. The shaft 105 has a pinion 106 intermeshing with a spur gear 107 of couplet 108 rotatably mounted on shaft 109. The gear 106 is in the ratio of 1 to 10 with the gear 107. The latter gear intermeshes with a second pinion 110 of couplet 111 and the pinion 110 is the same size as gear 106 whereby the couplet will be rotated at the same rate as shaft 105 and therefore the ratio between shaft 105 and pinion 110 is 1 to 1. The couplet 111 has, however, a large gear 112 which is in the ratio of 1 to 10 to pinion 110 and this gear intermeshes with a shiftable gear 113 slideably keyed on shaft 114 whereby when gear 113 is in mesh with gear 112 the shaft 114 is rotated in a 1 to 1 ratio with respect to shaft 105.

The couplet 108 has a pinion 115 intermeshing with gear 116 in a 1 to 10 ratio and the latter gear is adapted to be engaged by gear 113 so that the shaft 114 will now be rotated in a 1 to 10 ratio with respect to shaft 105.

The gear 116 has an integral pinion 117 intermeshing with gear 118 in a 1 to 10 ratio and gear 118 has a pinion 119 intermeshing with spur gear 120 in a 1 to 10 ratio whereby the total ratio between pinion 115 and gear 120 is one to a 100. The shaft 113 may also be shifted into mesh with gear 120, whereby the shaft 114 will be driven at a 100 to 1 reduction with respect to shaft 105. The shaft 114 has a gear 121 keyed thereto which intermeshes with a gear 122 fixed with a sleeve 123 which extends through the housing 124 of the unit and terminates in a gear 125 which is co-axial and adjacent to the gear 79 which is one of the output members of the reversing mechanism. Since the gear 125 is equal in diameter to gear 79 and adjacent thereto, it will be seen that there are two driven members, one of which is rotated at a fixed rate and the other at a very slow rate and that these two parts are so positioned that they may be selectively engaged by either the gear 83 or the gear 87 which gears actuate the table and the attachment respectively.

Thus, when it is desired to reduce the rate of rotation of the attachment driving shaft 92 with respect to the lead screw 80, the gear 88 may be shifted laterally into mesh with gear 125 and thereby interpose the reduction rate unit between the output of the reverser and the shaft 92.

Similarly, if it is desired to rotate the lead screw at a relatively slow rate with respect to the shaft 92 the gear 83 may be shifted laterally into mesh with gear 125 to thereby interpose the reduction rate change unit between the output of the reverser mechanism and the train to the lead screw.

The gear 113 of the reduction rate unit may be shifted by a fork 126 which, as shown in Figure 4, is fixed to the end of shaft 127, this shaft having a manually operable handle 128 in which is slideably mounted a hand grip 129, the end of which is reduced to engage a plurality of locating notches 130 formed on the exterior of the unit housing, whereby the gear may be held in any of its three positions.

There has thus been provided an improved mechanism for the purposes disclosed, which from an operating standpoint may be easily and quickly adjusted for plain milling operations by disengaging gear 88 from either gear 79 or 125; or engaging both gears 83 and 88 with gear 79 for spiral milling leads of intermediate angles; or shifting either of gears 83 and 88 into mesh with gear 125 for milling long or short leads.

Since the reduction unit is capable of effecting such a large reduction, it will be apparent that the power must go through it in one direction, that is, from the high speed side to the low speed side, and when manual operation is desired the handle 131 attached to the end of the lead screw 80 may be utilized for operating all of the parts when the gear 83 is connected to the high speed gear 79, and the handle 132 utilized when the gear 88 is connected to the high speed gear 79.

What is claimed is:

1. In a milling machine having a rotatable cutter spindle, a reciprocable table and an attachment carried thereby, the combination of transmission means for effecting reciprocation of the table and actuation of the attachment, a power shaft, transmission trains extending to the table and to the attachment respectively, a rate reduction unit, and means for selectively interconnecting said unit between said power shaft and either of said trains.

2. In a milling machine having a table, a rotatable cutter, and a rotatable work holder carried by the table for movement thereby with respect to the cutter, the combination of means for effecting said movement including a first train coupled for actuation of the table, a second train coupled for actuation of the work holder, a shiftable gear rate change mechanism having an input connected to a source of power, and means to selectively connect the output thereof to either of said trains.

3. In a milling machine having a table, a rotatable cutter, and a rotatable work holder carried by the table for movement thereby with respect to the cutter, the combination of means for effecting said movement including a first train coupled for actuation of the table, a second train coupled for actuation of the work holder, a shiftable gear rate change mechanism having an input, means to reversibly connect said input to a source of power, and means to selectively connect the output thereof to either of said trains.

4. In a milling machine having a column, a cutter spindle journaled in the column, a saddle supported by the column for adjustment in a direction parallel to the cutter spindle, a table reciprocably mounted in the saddle for movement transversely of the cutter spindle, a rotatable work holder carried by the table, and means for reciprocating the table and rotating the work holder including a power shaft journaled in the saddle, a shiftable change gear unit carried by the saddle having an input shaft selectively connectible to said power shaft, said mechanism also having an output rotor, and means to selectively connect said rotor to the table or work support for several actuation by the mechanism; or both the table and work support for simultaneous actuation.

5. In a milling machine having a column, a cutter spindle journaled in the column, a saddle supported by the column for movement parallel to the axis of said cutter spindle, a table carried by the saddle, an attachment carried by the table, the combination of rotors movable with the table for actuating the table and attachment, a power driven element journaled in the saddle, a change gear mechanism carried by the saddle having an input rotor and an output rotor, means to connect the output rotor severally or simultaneously to the first-named rotors, said input rotor being connected to said element, and portions on said element adapted to be connected to the remaining one of the first-named rotors during several connection of the other to said output rotor.

6. In a milling machine having a saddle, a table and an attachment carried by the table, the combination of means for actuating the table and attachment including a pair of rotatable elements movable with the table, a pair of rotors journaled in the saddle and having a spline connection with said elements, a power driven reversing mechanism carried by the saddle having an output selectively connectible with said elements, and a gear reduction unit detachably mounted on the saddle for interposition between the reversing mechanism and one of said elements for reducing the rate of actuation thereof relative to the other.

7. In a knee and column type milling machine having a saddle, a table, and an attachment superimposed one upon another, the combination of means for translating the table and actuating the attachment including two rotors journaled in the saddle and power actuable at different rates, a first train extending to the table, a second train extending to the attachment, and means to selectively connect the trains to said rotors in different combinations whereby either train may be actuated at a fast rate and the other at a slow rate, or both trains actuated at the same rate.

8. In a milling machine the combination with a reciprocable table and a work rotor carried thereby, the combination of means for actuating said parts including a first train extending to the table, a second train extending to the rotor, a power rotatable member, individual shiftable elements for coupling either train with said element and a rate change mechanism adapted to be selectively interposed between either of said shifters and said element to differentiate the rates of actuation of said trains.

9. In a milling machine having a reciprocable table and a work rotor carried thereby, the combination of transmission means for said parts including individual rotors carried by the table and respectively connectible to the table and to the rotor, a power operable reversing mechanism including a gear connected for opposite rotation thereby, and shifters individual to said rotors for selectively connecting the table or the work rotor to said gear for several actuation thereby, or for joint actuation thereby.

10. In a machine tool the combination with a reciprocable table and a work attachment carried thereby, the combination of means for selectively actuating said parts individually or simultaneously including a power train terminating in a reversing mechanism including a clutch shiftable to a first and second position for determining direction, and to a third or intermediate position for interrupting the power drive, means to selectively connect the table to said clutch mechanism for individual actuation thereby, means to selectively connect the table and rotor to said clutch for simultaneous movement thereby, and means trip operable by the table for shifting said clutch from either its first or second position to its third position.

11. In a milling machine having a saddle, a table, and an attachment carried by the table, the combination of means for driving said attachment including a power shaft journaled in the saddle, a first rate change gearing carried by the table, means operatively connecting said rate change gearing to the attachment, a second rate change gearing carried by the saddle, and means to operatively connect both of said rate change gearing in series between said power shaft and said attachment.

12. In a milling machine having a saddle, table and attachment carried thereby, the combination of a power operable reversing mechanism mounted in the saddle, a lead screw journaled in the table and connectible with said reverser for actuation thereby, rate change gearing carried by the saddle, and means to connect said attachment directly with said reverser, or in serial relation with said rate change gearing and reverser without disturbing said lead screw connection.

13. In a milling machine having a saddle, a table mounted thereon and an attachment carried by the table, the combination of a power operable reversing mechanism mounted in the saddle, rate change gearing carried by the saddle, means operatively connecting said rate change gearing with the reversing mechanism, and means to selectively connect the table or attachment in series with said rate change mechanism for actuation thereby in opposite directions.

14. In a milling machine having a saddle, a table and an attachment carried thereby, the combination of a power reversibly operable member journaled in the saddle, and means to selectively connect the table or the attachment to said member for actuation thereby.

15. In a milling machine having a saddle, table and attachment carried thereby, the combination of transmission means for actuating said parts including a first pair of gears journaled in the saddle and actuable at relatively high and low rates respectively and in opposite directions, a pair of shiftable gears journaled in the saddle, means operatively connecting one of said shiftable gears for actuating the table, means for connecting the other shiftable gear for actuating the attachment, each of said shiftable gears having three positions whereby they may be selectively engaged with either of said first pair of gears, or in a non-power transmitting position.

16. In a milling machine having a table and an attachment, a first splined rotor for actuating the table, a second splined rotor for actuating the attachment, a power shaft, a first gear driven by said power shaft at a relatively high rate of speed, a second gear connected by a rate reducer to the power shaft for actuation thereby at a relatively low rate of speed, means splined on said rotors and selectively connectible with said first mentioned gears whereby either rotor may be actuated at a high speed and the other at a low speed, means to disconnect said power shaft from all of said gears, separate manually operable means associated with the respective rotors whereby the manually actuable means associated with the rotor connected for high speed rotation may be utilized for manually actuating both of said rotors.

17. In a milling machine having a saddle, a housing pivotally mounted on said saddle and having guide ways therein, a table reciprocably mounted in said guide ways, and an attachment carried by said table, the combination of means for actuating the table and attachment including a power shaft journaled in the saddle and coincident with the axis of rotation of the housing, a rate change gearing carried by the housing, an additional rate change gearing carried by the table, means to connect said first rate change gearing in series with the power shaft for actuating the table, or in series with the second rate change gearing for actuating the attachment, and means to swivel said housing without breaking said connection.

18. In a milling machine having a saddle structure, a table reciprocably mounted thereon and an attachment carried by the table, the combination of means for driving the table and the attachment including a power shaft, a first rate change gearing, a second rate change gearing, one of said rate change gearings being connected in series with the attachment, means to selectively connect the other rate change gearing in series with the table or attachment, and means carried by the saddle for shifting the gears of the last named rate change gearing.

19. In a milling machine having a saddle, a table and an attachment carried thereby, the combination of transmission means for actuating the table and attachment including a power shaft journaled in the saddle, a first rotor connected for driving the table, a second rotor connected for driving the attachment, rate change gearing connecting said second rotor with the attachment, an additional rate change gearing, means to selectively connect either of said rotors for actuation by said additional rate change gearing, a reversing mechanism connecting the remaining rotor and said additional change gearing with said power shaft whereby they may be reversely operated thereby, and additional means in the driving mechanism to said attachment for changing the direction of actuation thereof with respect to the direction of movement of the table.

20. In a milling machine having a work table and a rotatable work support mounted thereon, the combination of transmission means for actuating said parts including a feed transmission, a rapid traverse transmission, a power shaft selectively connectible to either of said transmissions, separate trains extending to the table and the work support, a rate reduction unit having its input member connectible to said power shaft for operation thereby at a plurality of feed rates, or at a rapid traverse rate, means to selectively connect the output member of said unit to either of said trains whereby either train may be actuated at a slower rate than the other, and means to reverse the direction of rotation of said power shaft.

21. In a milling machine having a saddle, a table and an attachment carried by the table, the combination of means for driving said attachment including a power shaft journaled in the saddle, a first rate change gearing carried by the table, means operatively connecting said rate change gearing to the attachment, a second rate change gearing carried by the saddle, means to operatively connect both of said rate change gearings in series between said power shaft and said attachment, means to drive said output shaft at a plurality of feed rates or at a rapid traverse rate, and means for reversing the direction of rotation of said power shaft whereby the table and attachment may be operated in one direction at a plurality of feed rates and in an opposite direction at a rapid traverse rate.

22. In a milling machine having a saddle, a table, and an attachment carried by the table, the combination of a power reversible operated member journaled in the saddle, means to actuate said member at a plurality of feed rates or at a rapid traverse rate, and means to selectively connect the table or the attachment to said member for actuation thereby.

WALTER D. ARCHEA.